United States Patent [19]

Langham

[11] Patent Number: 4,574,474
[45] Date of Patent: Mar. 11, 1986

[54] METHOD AND APPARATUS FOR MOLDING AN ELECTRICAL PLUG WITH INTERNAL PROTECTIVE CAP

[75] Inventor: Jack K. Langham, Croydon, England

[73] Assignee: U.S. Philips Corporation, New York, N.Y.

[21] Appl. No.: 597,761

[22] Filed: Apr. 6, 1984

[30] Foreign Application Priority Data

May 20, 1983 [GB] United Kingdom ............... 8313983

[51] Int. Cl.[4] .................. H01R 43/00; B23P 19/00
[52] U.S. Cl. ....................................... 29/858; 29/748;
264/40.5; 264/272.15; 425/136; 425/150
[58] Field of Search .......... 29/858; 264/40.5, 272.14,
264/272.15, 275, 328.1; 425/129 R, 135, 136,
150, 468, 29

[56] References Cited

U.S. PATENT DOCUMENTS

| 2,946,088 | 7/1960 | Soderquist | 425/136 X |
| 4,021,515 | 5/1977 | Neuman | 264/40.5 |
| 4,470,786 | 9/1984 | Sano et al. | 264/272.14 X |

FOREIGN PATENT DOCUMENTS

| 1277288 | 6/1972 | United Kingdom . | |
| 1604426 | 12/1981 | United Kingdom | 29/858 |
| 2095924 | 10/1982 | United Kingdom | 29/858 |

Primary Examiner—Mark Rosenbaum
Assistant Examiner—Carl J. Arbes
Attorney, Agent, or Firm—Robert J. Kraus

[57] ABSTRACT

In a method of manufacturing a moulded-on mains plug of the type having a base 3, an insulating cap 1 covering wire connection points 9, and a moulded-on plug body, the presence and position of the cap 1 is detected by probe pins 37,39 of a pressure member 31 coupled to a position detector 47. The arrangement is such that the moulding material can only be injected into the moulding die 27,29 if the cap 1 is substantially in its correct position as shown in FIG. 2. In this way, it is not possible to produce a moulded-on mains plug having no insulating cap or in which the cap is provided but is incorrectly positioned.

7 Claims, 3 Drawing Figures

4,574,474

METHOD AND APPARATUS FOR MOLDING AN ELECTRICAL PLUG WITH INTERNAL PROTECTIVE CAP

BACKGROUND OF THE INVENTION

This invention relates to a method of manufacturing a domestic moulded-on mains plug of the type comprising an electrically-insulating base provided with conductive contact members, such as metal pins which project from one side of the base for insertion into an electrical socket, and which are connected to respective wires of an electrical cable by connections on the other side of the base. The plug includes an electrically-insulating cap which extends over at least two of the wire connections, and an injection-moulded plug body moulded onto the base and enclosing the cap, the connections, and the end of the cable.

A plug of the type defined is known from British patent specifications Nos. 1,581,661 and 1,595,782. In each of these plugs the insulating cap is provided over at least the live, or high voltage, connections as a safety measure to ensure that if any strands of wire are displaced during the injection moulding of the plug body onto the base, these strands cannot reach the surface of the plug body where they could be touched by the user. In order to ensure that the insulating cap is incorporated in each plug, each of the abovementioned patent specifications discloses an arrangement in which a portion of the insulating cap is visible on the outer surface of the finished plug.

Visual inspection methods, however, are generally unsatisfactory in that their absolute effectiveness cannot be guaranteed because they require the full continuous concentration of the operators concerned. Fatigue, eye strain, or momentary distraction of the operator(s) could, in the present case, allow plugs without caps to escape detection, with possibly highly dangerous results.

Another disadvantage of visual inspection methods is that positive action must be taken to destroy any plugs that fail the visual inspection test. In that fairly close inspection is required to identify faulty plugs, such plugs must be rendered unusable at the time they are inspected visually. Otherwise the lack of immediately-obvious fault indications could result in dangerous plugs being released for use.

British patent specification No. 2,088,654 discloses a fused plug which is automatically rendered unusable if the insulating cap is not during in place in the moulding-on process. The plug concerned has a recess between the pins to accommodate the fuse and there is at least one hole through the base into the recess. If a cap is provided, the cap closes this hole. If no cap is provided, however, the plastic material which is injected during the moulding stage flows through the hole into the fuse recess. Even if a faulty plug is not detected at the end of the moulding-on process, it will be inevitably rejected at the next stage during which the fuse has to be fitted, since it is not possible to fit the fuse in the recess. This not only eliminates the need for the visual inspection, but also automatically renders the plug unusable.

In all the plugs disclosed in the above-mentioned specifications, the lack of an insulating cap is not detected until after the moulding-on stage—i.e. when the whole manufacturing process has been completed except for fitting the fuse. Thus in each case the material and labour costs of a fully manufactured plug, with its attached cable, are wasted in the event of a missing cap.

SUMMARY OF THE INVENTION

An object of the invention is to mitigate all the above-mentioned disadvantages.

According to one aspect of the invention, there is provided a method of manufacturing a domestic moulded-on mains plug of the type hereinbefore defined. The method includes the steps of connecting the wires of the cable to respective metal pins, locating the insulating cap on the base to extend over at least two wire connections, locating the so-formed assembly of base, pins, and cap in the cavity of an injection moulding die and moulding the plug body onto the assembly to enclose the connections, the cap, and the end of the cable. With the assembly in the cavity, and before the injection of the moulding material, the method includes the further step of mechanically detecting whether or not the cap is located in a pre-determined position in the cavity. Preferably the injection of the moulding material can commence only if the cap is located substantially in said the predetermined position.

The invention also relates to a domestic moulded-on mains plug manufactured by this method.

According to a further aspect of the invention, there is provided an injection moulding apparatus having a moulding die and at least one cavity therein for moulding the plastic body of a domestic moulded-on mains plug of the type hereinafter defined. The apparatus includes, for each cavity, a mechanical detector arranged to detect the presence or absence of the cap in a pre-determined position in the cavity. Preferably the injection moulding process is allowed to commence only if the cap is detected substantially in the position.

It will be readily appreciated from the above that if the detector detects that the cap is not in the pre-determined position, this fact can be made self-evident to the operator concerned, who must then open up the moulding die and provide the missing cap(s) in order to be able to complete the process. Thus no plugs with missing caps can be produced by the method according to the invention and no visual inspection is necessary to ensure the presence of the cap in the finished plug. Further, no plugs are wasted on account of missing caps.

In some plug designs, it may be possible for the cap to be incorrectly located on the base (i.e. not properly seated on the base). Whilst it may be doubtful that such incorrect locating of the cap will result in a possibly dangerous plug, a displaced cap would almost undoubtedly lead to an immediately apparent and unacceptable appearance. An advantage of the method according to the invention is that, since an incorrectly-located cap will not be in its correct (i.e. pre-determined) position in the die cavity, the moulding-on process cannot be started until the cap is correctly located.

Conveniently, the detector referred to above includes at least one pressure pin which projects into the cavity and which is arranged to bear against the cap such that the position of the pin is indicative of the position, or absence, of the cap. The detector further includes means for sensing the position of the pin and means for allowing the injection moulding process to commence only if the sensed position of the pin corresponds to the pre-determined position of the cap. This provides a very simple means for detecting the precise location, or absence, of the cover. It will be obvious to those skilled in the art that there are many various ways of causing a movable member such as the pin to allow an operation to be effected in dependence upon the position of the pin. Thus, for example, the pin may control, either directly or indirectly, a valve in the plastic flow line to the moulding die.

BRIEF DESCRIPTION OF THE DRAWING

An embodiment of the invention will now be described, by way of example, with reference to the accompanying drawing, of which

DESCRIPTION OF THE PREFERRED EMBODIMENT

Figure 1:
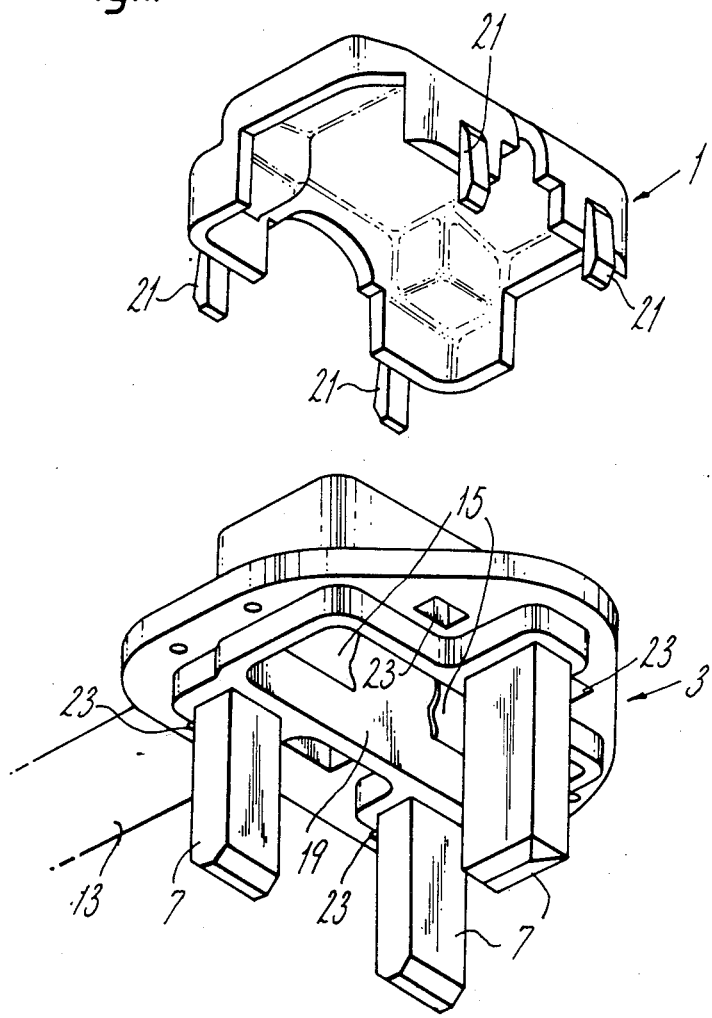
FIG. 1 shows an exploded view of a plug base with metal pins and the insulating cover.
Figure 2:
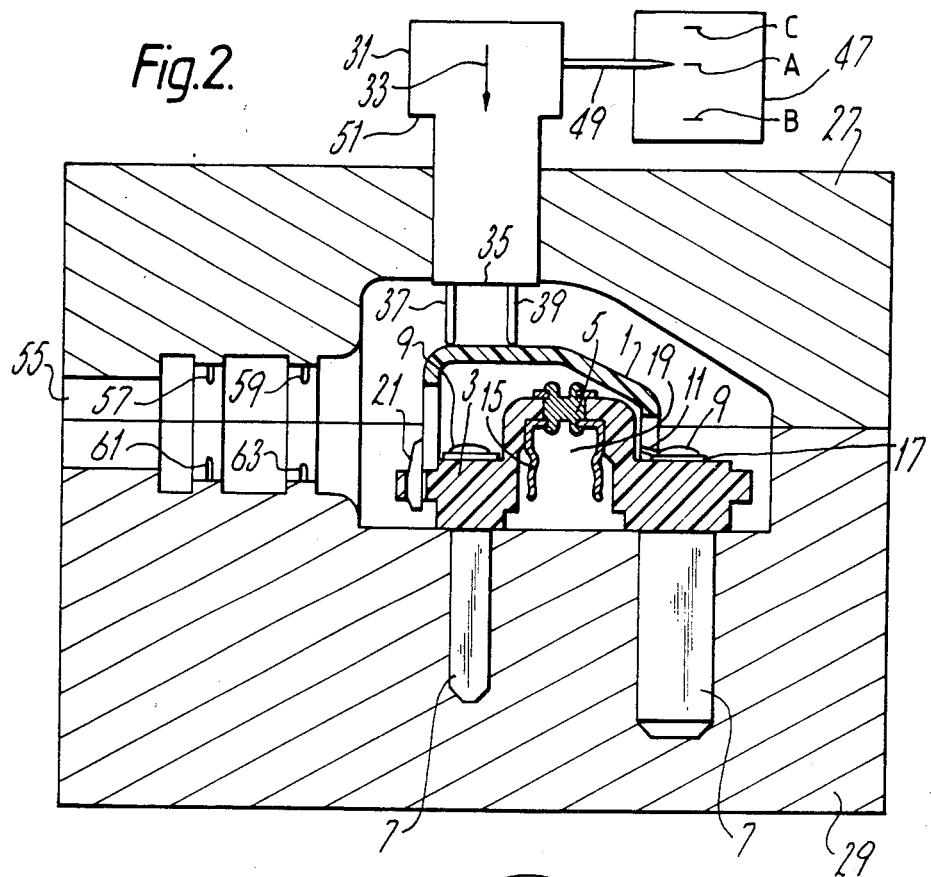
FIG. 2 shows a schematic view of a closed moulding die having plug components located in its cavity for moulding-on the plug body.

Referring to FIGS. 1 and 2, FIG. 1 shows, from top to bottom, an insulating cap 1 and a base 3. From the front of the base 3 (the lower side in FIG. 1) project three rectangular metal connection pins 7 which are provided with connection points 9 (FIG. 2) on the rear of the base. In the finished plug, each connection point is connected to a respective conductor 11 of a connection cable 13. To this end, at the end of each conductor wire is formed a lug 17 which is riveted to the connection point 9. Only a portion of one of the three conductors 11 is visible in FIG. 2, in which Figure the cable 13 is also omitted so that the details of the moulding die can be seen. The connection of the live pin to its associated conductor is realized via two fuse clips 15 which are held in place by respective metal rivets 5 and, in use of the plug, are interconnected by means of a fuse, not shown. The fuse is accommodated in a fuse holder (also not shown) which fits in a fuse chamber 19 which is recessed in the base 3 and which contains the fuse clips 15. The right-hand connection pin 7 in the base shown in FIG. 1 is the earth pin and the other two connection pins 7 are the neutral and live pins. For example, the extreme left pin 7 is the live pin and is connected to a conductor wire of the connection cable 13 via the fuse clips 15 and the fuse.

The insulating cap 1 is provided with locating legs 21 which project into openings 23 in the base when the insulating cap is fitted on the rear of the base 3. Alternatively, the cap 1 may be shaped to be a push-on fit around the walls of the fuse chamber 19. It is not necessary to lock the cap onto the base since, as explained below, it is held firmly in position during the moulding-on process.

The assembly comprising the cap 1, body 3, and cable 13 is then inserted into the moulding cavity of a moulding die comprising two portions 27 and 29, which are separable in order to allow the insertion of the assembly. It is to be understood that the particular form of die shown in FIG. 2 is representative only, the particular configuration not being relevant to the invention. In practice, the die would contain a plurality of such cavities so that a group of plugs is manufactured in each moulding operation.

Figure 3:
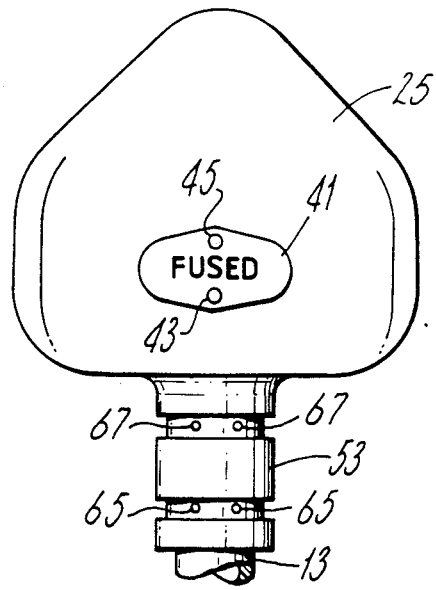
FIG. 3 shows a finished plug manufactured by the method described.

The die is provided with a member 31 which is movable in the vertical direction (as shown in FIG. 2) under a pressure applied in the direction of arrow 33 by means not shown. Fixed to the lower end face 35 of member 31 are two parallel coextensive pressure pins 37 and 39 which bear against the cap 1 with a pressure sufficient to hold the cap in its correct pre-determined position on the base during the moulding process. The end face 35 of member 31 projects slightly into the moulding cavity such that, in the finished plug as shown in FIG. 3, a shallow recess 41 is formed having two holes 43 and 45 formed by pressure pins 37 and 39 respectively.

The end face 35 is engraved such that the word FUSED appears in the recess 41 of the finished plug. Alternatively, the end face 35 may for example be engraved with a trade mark. Because member 31 is a removable insert, it is an easy and inexpensive operation to change the marking on its end face 35, for example to provide different users' trade marks.

It will be appreciated that the height in the moulding cavity of the surface of cap 1, in which cavity the pins 37 and 39 are located, is subject to very slight change from sample to sample due to manufacturing tolerances. The provision of the recess 41 allows for these tolerances and variations are not noticeable since only the depth of the recess is affected. If face 35 were to be arranged flush with the surrounding surface of the moulding cavity, the tolerances would result in the manufacture of some plugs having a recess 41, some having a flush upper surface with a visible outline left by the member 33, and some having a raised platform. These differences would be immediately visible and would result in a lack of uniformity in the finished products.

FIG. 2 shows a schematic representation of a position detector 47 which detects the vertical position of member 31 by the position of a coupling member 49 represented as an indicator pointer. If the cap 1 is in its correct position as shown in FIG. 2, then the pointer 49 is at the indicated position A. In this case the position detector 47 allows the injection moulding process to take place.

If cap 1 were missing, then the shoulder 51 on member 31 would move downward (as viewed in the drawing) under the applied pressure until it rests on the upper surface of the die portion 27. In this position, indicated as B, the position detector 47 prevents the injection of moulding material.

It is alternatively possible for the case to arise where the cap 1 is provided but it is not seated properly on the base 3. In this case the cap would be in a higher position than that shown in the drawing, for example in a position indicated by C. Member 31 and position detector 47 are so arranged that the moulding-on operation cannot take place unless the cap is provided and is in its correct position on the base within given tolerances. It will be appreciated from FIG. 2 that these tolerances can be quite wide in practice whilst nevertheless ensuring that it is impossible to manufacture a moulded-on mains plug in which loose conductor strands can reach the outer surface of the moulded-on plug body 25.

It will be evident to those skilled in the art that there are several alternative ways of implementing the detecting means to ensure that the cap is substantially in the required position. Thus, for example, the member 31 may be arranged to interrupt a gallery through which the moulding material is injected into the moulding cavity and to be provided with a passage therethrough which is in alignment with the gallery only when in the position shown in FIG. 2. This provides a very simple method in which the functions of member 31 and detector 47 are combined.

Alternatively detector 47 may be an electrical switch, such as a microswitch, operated by coupling 49 only when the latter is in the position shown in FIG. 2. The switch then operates a solenoid-type valve in the injection gallery.

Whilst the refusal of the apparatus to perform the injection moulding operation will normally be sufficient to draw the operator's attention to the fact that the cap has not been provided or is incorrectly located, the detector 47 may, if required, be arranged to provide an audible and/or visible alarm.

For the purpose of clarity, the heating means for the mould and also the injection galleries are not shown. They may have many alternative forms and are well known in the art. The cable 13 has also been omitted from FIG. 2 in order to show the configuration of the portion of the moulding cavity which produces the cord grip 53 shown in FIG. 3. A portion 55 is dimensioned to surround the cable 13 sufficiently tightly to prevent any moulding material, e.g. polyvinyl chloride with an appropriate particulate filler material, from creeping along the cable. Four pairs of pins 57, 59, 61, and 63 are arranged to hold the cable centrally in the cord grip portion during the moulding process. The pin pairs 57 and 59 cause corresponding hole pairs 65 and 67 (FIG. 3) to be formed in the finished cord grip.

Whilst an embodiment of the invention has been described with reference to a plug having three pins for insertion into a power supply socket, the invention is of course equally applicable to mains plugs which have different pin configurations and different numbers of pins.

I claim:

1. A method of manufacturing an electrical plug of the type comprising an insulative base having a plurality of conductive contact members extending therethrough from a front side to a rear side of the base, electrical connections being made at the rear side between the contact members and respective conductors of an electrical cable, said method comprising the steps of:
    (a) placing in a predefined position on the rear side of the base an insulative cap extending over at least two of the electrical connections, said cap having a portion extending a predetermined height above said rear side when it is in said predefined position;
    (b) enclosing the base and the cap in a mold cavity at a location where said portion of the cap will contact a movable portion of a position detection means for indicating whether the cap is in the predefined position;
    (c) if the cap is detected in the predefined position, filling the cavity with insulative molding material for encapsulating at least the rear side of the base along with the electrical connections, the cap and the conductors; and if the cap is not detected in the predefined position, not injecting insulative molding material into the cavity.

2. A method as in claim 1 where the movable portion of the position detection means is mechanically biased toward the insulative cap.

3. A method as in claim 1 or 2 where the position detection means visually indicates whether the cap is in the predefined position.

4. A method as in claim 1 or 2 where the position detection means gives an electrical indication of whether the cap is in the predefined position.

5. A method as in claim 4 where the flow of the insulative molding material into the cavity is electrically controlled in response to said electrical indication.

6. A method as in claim 1 or 2 where the flow of the insulative molding material into the cavity is mechanically controlled in response to the position of the movable portion of the position detection means.

7. A molding apparatus for manufacturing an electrical plug of the type comprising an insulative base having a plurality of conductive contact members extending therethrough from a front side to a rear side of the base, electrical connections being made at the rear side between the contact members and respective conductors of an electrical cable, said apparatus comprising:
    (a) a mold having a cavity for containing the plug and an insulative cap placed in a predefined position on the rear side of the base, said insulative cap extending over at least two of said electrical connections, said cap having a portion extending a predetermined height above said rear side when it is in said predefined position;
    (b) a position detection means including a movable portion disposed in the mold in a location where said portion of the position detection means will contact said portion of the insulative cap, said position detecting means indicating whether the cap is in the predefined position; and
    (c) means operatively associated with said position detection means responsive to an indication that the cap is in the predefined position for filling the cavity with insulative molding material for encapsulating at least the rear side of the base along with the electrical connections, the cap and the conductors.

* * * * *